US009283960B1

(12) United States Patent
Lavoie

(10) Patent No.: US 9,283,960 B1

(45) Date of Patent: Mar. 15, 2016

(54) CONTROL OF A VEHICLE TO AUTOMATICALLY EXIT A PARKING SPACE

(71) Applicant: FORD GLOBAL TECHNOLOGIES, LLC, Dearborn, MI (US)

(72) Inventor: Erick Michael Lavoie, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/570,339

(22) Filed: Dec. 15, 2014

(51) Int. Cl.
*B60W 30/06* (2006.01)
*B60W 10/20* (2006.01)
*B60W 10/18* (2012.01)

(52) U.S. Cl.
CPC ............... *B60W 30/06* (2013.01); *B60W 10/18* (2013.01); *B60W 10/20* (2013.01); *B60W 2550/10* (2013.01); *B60W 2710/18* (2013.01); *B60W 2710/20* (2013.01); *B60W 2710/207* (2013.01); *B60W 2720/10* (2013.01)

(58) Field of Classification Search
USPC .......................................................... 701/41
See application file for complete search history.

(56) References Cited

U.S. PATENT DOCUMENTS 6,906,640 B2 6/2005 Gotzig et al.
8,560,175 B2 10/2013 Bammert et al.
2005/0060069 A1* 3/2005 Breed .................. B60N 2/2863 701/408
2005/0137766 A1* 6/2005 Miyakoshi ................ B60T 7/22 701/36
2007/0152804 A1* 7/2007 Breed .................. B60N 2/2863 340/435
2008/0215202 A1* 9/2008 Breed ................ G01C 21/3611 701/25
2008/0215231 A1* 9/2008 Breed .................... G08G 1/161 701/117
2009/0260907 A1* 10/2009 Moshchuk ......... B62D 15/0285 180/167
2010/0204866 A1* 8/2010 Moshchuk ......... B62D 15/0285 701/25
2011/0087405 A1* 4/2011 Moshchuk ......... B62D 15/0285 701/41
2012/0072067 A1* 3/2012 Jecker ................ B62D 15/0285 701/25
2012/0083960 A1* 4/2012 Zhu ...................... G05D 1/0214 701/23
2012/0089294 A1* 4/2012 Fehse .................... B60W 30/06 701/25
2012/0173080 A1* 7/2012 Cluff .................. B62D 15/0285 701/42
2013/0110342 A1 5/2013 Wuttke et al.
2014/0121930 A1* 5/2014 Allexi ................... B60W 50/10 701/70
2014/0350855 A1* 11/2014 Vishnuvajhala ... G01C 21/3685 701/538
2015/0039211 A1* 2/2015 Stefan .................... G08G 1/143 701/117
2015/0168155 A1* 6/2015 You ...................... G01C 21/206 701/409

FOREIGN PATENT DOCUMENTS

GB 2482384 A 7/2011
WO 2011029692 A1 3/2011

* cited by examiner

*Primary Examiner* — Thomas Tarcza
*Assistant Examiner* — Alex C Dunn
(74) *Attorney, Agent, or Firm* — Frank A. MacKenzie; Brooks Kushman P.C.

(57) ABSTRACT

An automatic park-out system is provided for a vehicle to assist in automatically exiting a parking space. The vehicle is equipped with various sensors configured to sense the location of external objects, such as vehicles surrounding the parking space and vehicle in the adjacent lane of traffic. At least one controller receives signals from these sensors and commands the vehicle to automatically move and align itself for exiting the parking space. The operator of the vehicle can depress the accelerator pedal to signal a desire to move out of the parking space. Even if the driver increasingly depresses the accelerator pedal, the at least one controller is programmed to limit an actual speed of the vehicle based on a distance between the vehicle and the external objects. This constraint placed on the actual speed be removed or reduced based on the distance increasing.

20 Claims, 4 Drawing Sheets

CONTROL OF A VEHICLE TO AUTOMATICALLY EXIT A PARKING SPACE

TECHNICAL FIELD

The present disclosure relates to a method and control strategy for controlling a vehicle to automatically exit a parking space.

BACKGROUND

Automatic parking (autopark), also known as Active Park Assist, is an autonomous vehicle maneuvering system that moves a vehicle into (park-in) or out of (park-out) a parking spot. Parking spots may range from parallel, perpendicular or angled parking spots. The autopark system aims to enhance the comfort associated with driving in constrained environments where much attention and experience is required to steer the vehicle. The park-in and park-out maneuvers are achieved by a coordinated and automated control of the steering angle and speed. Furthermore, sensors and cameras can detect objects (such as other vehicles) in the outside environment; the coordinated and automated control of the vehicle can take into account the sensed presence and location of these objects during the park-in and park-out events to ensure collision-free motion within the available space.

SUMMARY

According to one embodiment, a computerized method of exiting a vehicle from a parking space is provided. The method is implemented by one or more controller communicatively coupled to various sensors throughout the vehicle, as well as other controllers that command and actuate various movements and actions in the vehicle. The method first includes instructing a driver to release a steering wheel. Once a signal has been received indicating the steering wheel is released, the method includes limiting a maximum-permissible-speed of the vehicle based on a distance between the vehicle and an external object. The method then includes automatically steering the steering wheel, and automatically accelerating away from the parking space. As the car is accelerated away from the parking space, the method includes gradually increasing the maximum-permissible-speed based on the distance increasing.

According to another embodiment, a vehicle comprises a plurality of object-detecting sensors configured to detect a location of external objects, such as other vehicles in front of and behind a parallel parking space. At least one controller is programmed to, in response to an operator activating an operational mode configured to automatically assist the vehicle in exiting a parallel parking spot, limit an actual speed of the vehicle based on a distance between the vehicle and the external objects Another exemplary vehicle comprises a plurality of sensors configured to sense a location of a first object in front of the vehicle and a second object behind the vehicle while the vehicle is parked in a parallel parking spot between the first and second objects. At least one controller coupled to the sensors and programmed to reduce a constraint on permissible acceleration of the vehicle as the vehicle exits the parallel parking spot.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
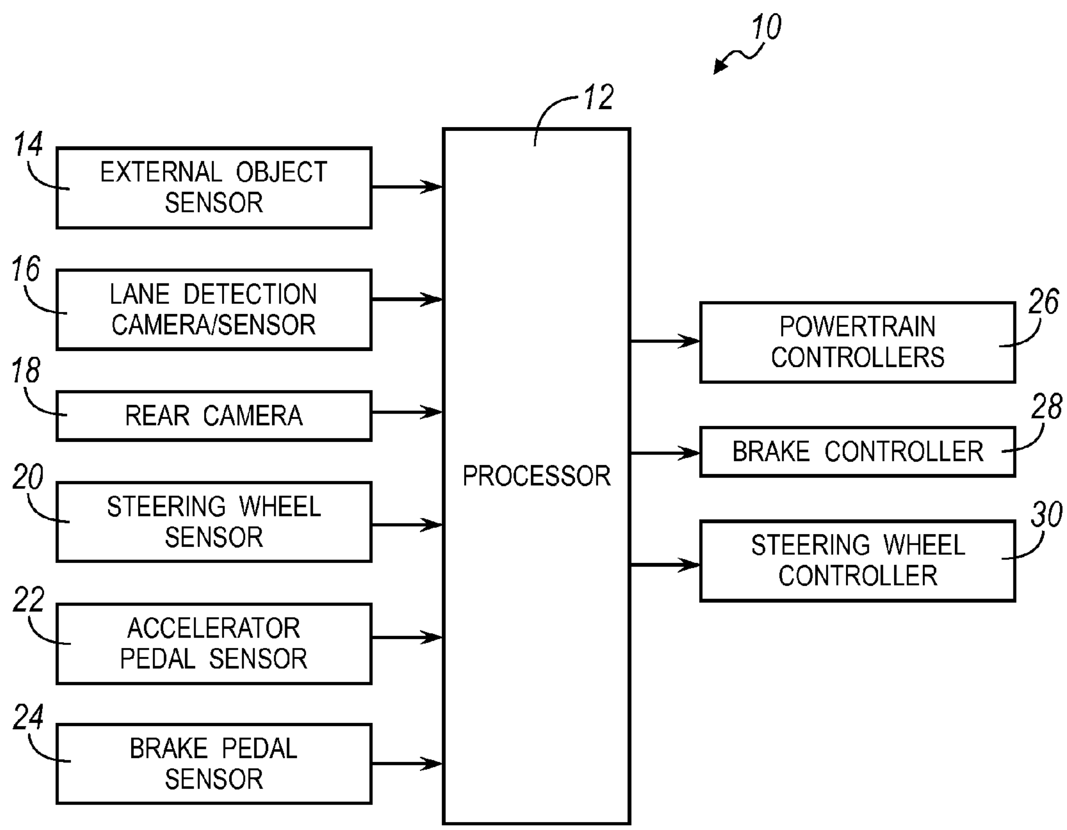
FIG. 1 is a schematic of a control scheme for controlling a vehicle according to one embodiment.

FIG. 1 illustrates a schematic of a control scheme 10 for controlling the vehicle during an automatic parking event. An automatic parking event, or autopark, can include either entering a parking space (park-in) or exiting a parking space (park-out). As will be explained in further detail, an operator of the vehicle can select a mode of operation so that the vehicle can automatically park itself and, if already parked, can automatically leave the parking space and enter into a driving lane.

As shown in FIG. 1, at least one processor 12 is communicatively coupled to various devices to receive input from the devices. The various devices allow the processor 12 to deliver signals to various control units that control the speed, direction, and overall operation of the vehicle during the autopark event. The various inputs to the processor 12 can include a plurality of external object sensors 14, one or more lane detection cameras or sensors 16, a rear camera 18, a steering wheel torque sensor 20, an acceleration pedal sensor 22, and a brake pedal sensor 24.

The one or more external object sensors 14 detect objects, such as other vehicles, around the vicinity of the vehicle itself. In one embodiment, one or more multi-function, all-weather sensors can be located on a front bumper region, a rear bumper region, a side panel region, on the windshield, or any other suitable location for sensing the relative location of external objects. For object detection, the sensors 14 have a predetermined coverage "field-of-view" or sensor coverage area. The sensor coverage area can be a composite of multiple sensor beams arraying outward in a generally symmetrical, fan-like pattern from origination points. Sensors which are suitable for the purposes of the present disclosure may include radar, lidar and vision based sensors, including active and passive infrared sensors.

In one embodiment of the present invention, the sensors 14 have a sensor coverage area for full front-looking functionality and side-looking functionality. Preferably, the sensor beam coverage area should be at least 180 degrees from the origination point, or preferably 270 degrees in certain locations. By locating the sensors 14 about multiple locations of the vehicle, a full-coverage area can be provided in all directions such that the vehicle can be aware of objects in any of its surrounding areas. Once detecting an object within range of the sensors 14, the information can be relayed to the processor 12 such that the processor can calculate the distance between the sensor and the external object.

The lane detection camera or sensor 16 can be part of a lane departure warning system in the vehicle. The lane detection camera or sensor 16 can be a video sensor that is, for example, mounted behind the windshield, integrated beside the rear mirror of the vehicle, and/or in front of the rear window of the vehicle and facing rearward. The lane detection camera or sensor 16 can also be one or more laser sensors or one or more infrared sensors mounted on or near the front of the vehicle. Any of the above lane detection cameras or sensors 16 is configured to communicate with an associated controller or processor (such as processor 12) that is programmed to recognize lane markings. The associated controller and the cameras or sensors cooperate with the autopark control scheme such that traffic lanes and parking lanes can be recognized when exiting a parking spot, as will be further discussed.

The rear camera 18 is a backup camera typically used for the purpose of aiding the operator in backing up the vehicle, and eliminating any rear blind spots. A view of the camera can be seen on a visual display, such as an LCD screen, so the operator can see directly behind the vehicle. The rear camera 18 can also be communicatively coupled to the processor 12 such that the processor can interpret the images and determine whether an object is in the field of view that would impede an autopark event.

The steering wheel sensor 20, as will be discussed further, is associated with the steering wheel of the vehicle and is configured to measure the amount of force or torque applied to the steering wheel. For example, during an autopark event, the vehicle may move the steering wheel and drive wheels automatically. However, according to the present disclosure and as will be described in further detail, a control strategy for controlling the vehicle during a park-out event may alter based on the user applying force or torque to the steering wheel. Additional detail regarding the steering wheel sensor and the automatic control of the steering wheel and drive wheels is provided with reference to FIG. 6 below.

The accelerator pedal sensor 22 is associated with an accelerator pedal in the vehicle. Similarly, the brake pedal sensor 24 is associated with a brake pedal in the vehicle. The sensors 22, 24 can determine the amount of force or displacement associated with movement of the pedal. Displacement of the accelerator indicates a desired acceleration of the vehicle. Additional detail regarding the desired acceleration of the vehicle, and how it relates with the actual permissible acceleration of the vehicle, will be further described below.

As indicated above, at least one processor 12 is programmed to receive data from the inputs of the various cameras and sensors 14-24. The processor can effectively recognize external objects surrounding the vehicle, and can issue commands to various controllers in the vehicle to control movement of the vehicle during an autopark event. For example, the processor 12 can control the powertrain controllers 26 to provide an amount of positive torque from an engine or electric motor to propel the vehicle accordingly. The processor 12 can also issue commands to a brake controller 28 to cause the brakes to be activated in the event an object becomes detected within the surroundings of the vehicle, potentially being stricken by the vehicle during the autopark event if the vehicle is not stopped. The processor 12 can also issue commands to a steering wheel controller 30 to turn the steering wheel (and thus the drive wheels) to an intended direction and steer the vehicle either into or out of a parking space.

Figure 2:
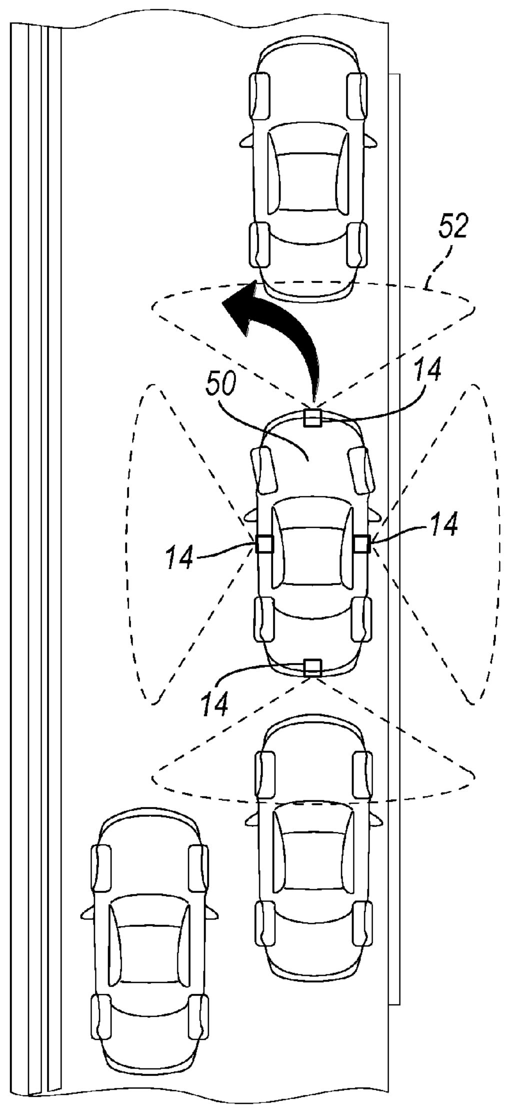
FIG. 2 is an elevated top view of a vehicle positioning itself in preparation for an exit of a parallel parking space based upon the location of external objects, according to one embodiment.
Figure 3:
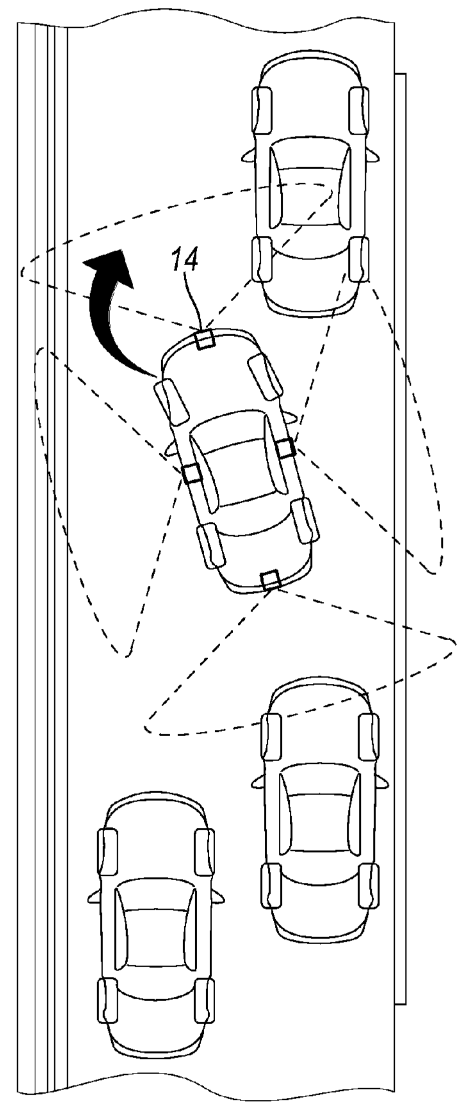
FIG. 3 is an elevated top view of the vehicle while exiting the parallel parking space based upon the location of external objects.

FIGS. 2 and 3 illustrate an example of a park-out event that can be at least partially performed by the control system described in the present disclosure. As shown in FIG. 2, the vehicle 50 is equipped with external object sensors 14 with a field of view 52 (as described above) to detect vehicles in front of, behind, and to the side of the vehicle 50. Of course, other cameras or sensors described above can be implemented into the vehicle 50 to also detect surrounding objects. The processor 12 within the vehicle then utilizes the received data from the cameras and sensors, processes the data and determines the distance between the vehicle and the other vehicles. The vehicle can then move itself into proper alignment to allow for a quick and smooth exit of the parking space. Next, during a park-out event, the vehicle is aware of its surroundings when automatically pulling out of a parking space. For example, the processor 12 will not command the vehicle to pull out of the parking space if other vehicles are in the lane of traffic directly adjacent to the vehicle or approaching the vehicle's periphery. When a path is clear and no objects are detected in the lane of traffic adjacent the parallel parking spot, the vehicle can begin to exit the parking space while as indicated by the arrow and shown in FIG. 3.

Figure 4:
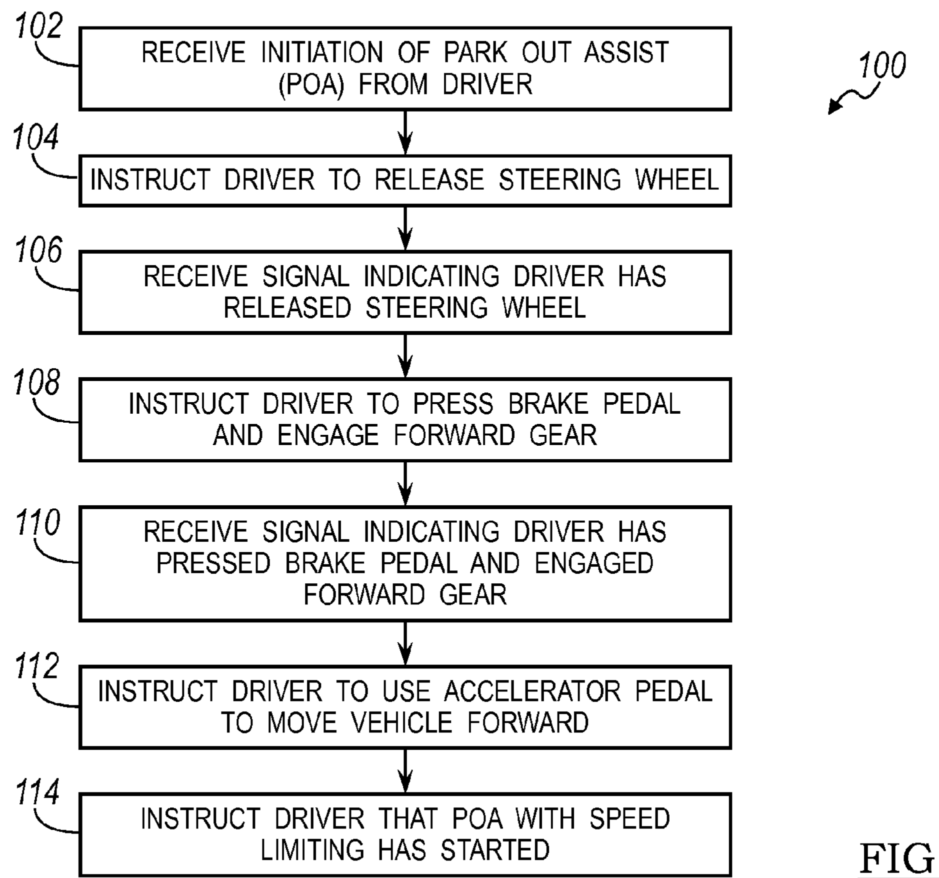
FIG. 4 is a representative flow chart of initiating a park out assist (POA) operational mode based on input from an operator of the vehicle, according to one embodiment.

Referring to FIG. 4, on example of an algorithm 100 utilized by the processor 12 during stages that lead up to a park-out event is illustrated. First, at 102, the processor receives a request by the operator of the vehicle to initiate a Park Out Assist (POA) session in which the vehicle can automatically assist the driver in exiting a parking space. Such a request from the operator can be received via the operator's selection on an in-vehicle touch screen communicatively coupled to the processor 12. The request may also be received via the operator depressing a button or other such mechanism that signifies the operator's desire to enter into a POA session.

With the vehicle parked, based on the POA request the processor then causes an instruction to be output to the operator alerting the operator to release the steering wheel at 104. To do so, the processor 12 can cause a visual or audio alert to the operator to release the steering wheel. At 106, the processor 12 receives a signal indicating that the operator of the vehicle has released the steering wheel. Such a signal can be sent to the processor 12 from a steering wheel torque sensor, as will be further described with reference to FIG. 6 below.

At 108, the processor 12 outputs a signal to instruct the driver to depress the brake pedal and engage the forward ("DRIVE" or "D") gear, if not already done so. Again, such an alert can be given to the operator either visually or audibly. After sending such a request, in response to the operator depressing the brake pedal and engaging the forward gear, a signal is received by the processor 12 of such activity at 110. Such a signal can be sent from a brake pedal sensor coupled to the brake pedal and configured to sense depression or movement of the brake pedal. This brake pedal sensor can be an existing sensor as part of a brake-by-wire system, for example.

It can be at this moment that the POA session can begin. As described throughout this disclosure, during the POA session the processor will receive signals from various sensors and/or cameras, and output signals to various controllers to control the movement of the vehicle to exit the parking spot. When the vehicle is ready to exit the parking spot based on the location of other vehicles and objects around, at 112 the processor outputs a signal to audibly/visually instruct the driver to use the accelerator pedal to move the vehicle forward. As will be described with respect to FIG. 5, the POA session can assist the operator by automatically controlling the vehicle to exit out of the parking space while placing speed limits on the vehicle. At 114, an instruction can be provided to the operator that the POA session has begun with speed limiting in place. Thus, the driver can be assured that his actual depression of the accelerator pedal may not directly translate into a corresponding amount of actual acceleration of the vehicle.

Figure 5:
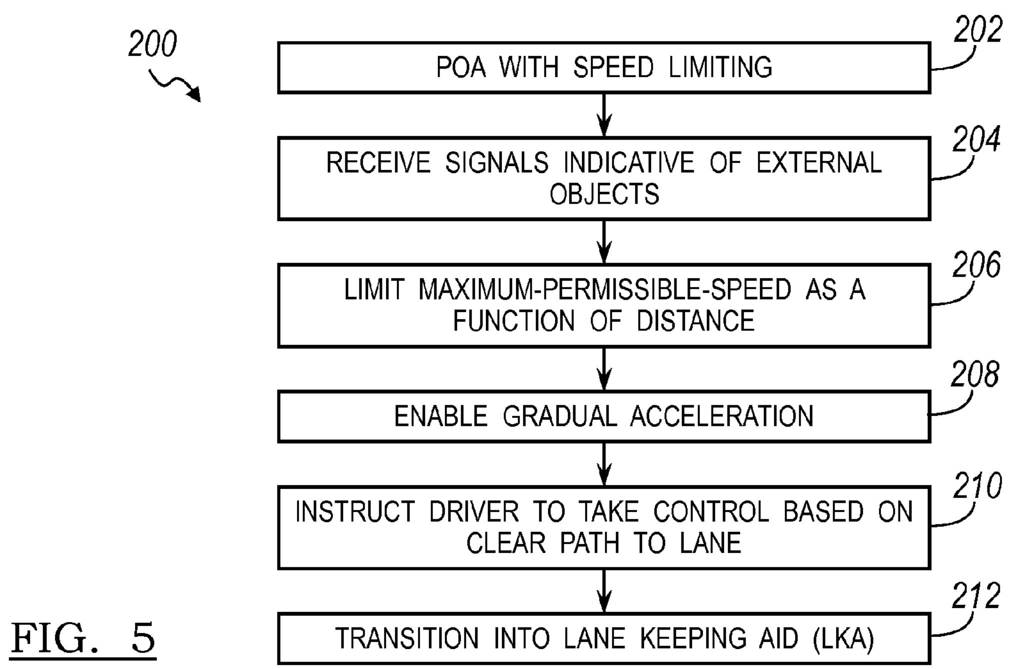
FIG. 5 is a representative flow chart of the POA operational mode in which the vehicle automatically exits a parking space, according to one embodiment.

Regarding FIG. 5, a separate POA session algorithm (or a continuation of the algorithm of FIG. 4) is illustrated at 200. The POA session has begun with speed limiting at step 202, similar to step 114 in FIG. 4.

At 204, the processor 12 receives signals from sensors and cameras, such as those described with respect to FIG. 1. These signals are the input that allow the processor to send commands to the various controllers 26, 28, 30 to control the movement of the vehicle. For example, based on the distance between the vehicle and objects behind, ahead, and to the side of the vehicle, the processor can command the vehicle to move steer and accelerate out of the parking space when it is clear to do so.

When the path is clear, the vehicle begins to automatically accelerate away from the parking space. At 206, a limit is placed on the maximum permissible speed and/or on the maximum permissible rate of change of speed (acceleration). This limit can alter based on the difference between the vehicle and the detected external objects, such as other vehicles ahead of the vehicle. While the operator depresses the accelerator pedal, indicating a desired acceleration to propel the vehicle away from the parking space, the controller will permit a limited acceleration; the limit on the speed and/or acceleration is based on how far away the external objects are.

In a working example, based on the detected objects around the vehicle when a POA session is initiated, an intended direction of travel is determined by the processor, and the steering wheel and acceleration of the vehicle is accordingly controlled. As an object along this path or within a "buffer zone" about the vehicle becomes closer, the speed and/or acceleration of the vehicle is automatically limited accordingly. For example, the vehicle may be allowed to reach 4 kph based on the distance between the vehicle and another vehicle ahead being several meters. This distance may decrease between the two vehicles as the vehicle accelerates away from the parking space during a park-out maneuver. As the distance decreases to 1.5 m, the processor 12 may limit the maximum permissible speed to 1.5 kph. Of course, while the vehicle "clears" the other vehicle ahead while moving away from the parking space, the maximum permissible speed may increase again accordingly.

This maximum permissible speed/acceleration may increase and decrease according to a linear relation with respect to the distance between the vehicle and other external vehicles. Of course, other non-linear relationships may exist. For example, a curved relationship may exist such that the maximum permissible speed/acceleration reduces at a faster rate as the distance decreases.

At 208, a gradual increase in maximum permissible speed and/or acceleration is permitted as the vehicle exits the parking space. As the vehicle exits the parking space and the distance from the vehicle to the external objects increase, the speed of the vehicle is permitted to gradually increase to reflect the accelerator pedal position. As described above, at step 112 the operator depresses the accelerator pedal and the vehicle accelerates in a limited fashion. In step 208, the processor allows the limitations on the maximum permissible speed and/or acceleration to reduce. In other words, the difference between a demanded acceleration (based on accelerator pedal position) and an actual commanded acceleration reduces during this gradual acceleration at 208.

A transition between the limited maximum permissible speed and/or acceleration to the removal of such limits may be completed over a tunable distance between the vehicle and the other vehicles. In other words, the transition from being speed-limited to non-speed-limited can occur as the distance between the vehicle to the other vehicles increases towards a certain programmable distance. Alternative to, or in combination with, accomplishing the transition over a tunable distance (e.g., 20 feet), the transition can also occur over some tunable time value (e.g., 3 seconds).

At 210, at some point as the vehicle is gradually accelerating, the processor provides an audible/visual instruction to the operator to take control of the steering wheel. Such an instruction can also be in response to a clear path existing in front of the vehicle in the traffic lane that the vehicle has turned onto. Once the operator takes control of the steering wheel, as determined by a signal received from the steering wheel torque sensor, the vehicle may exit the POA session and enable normal control of the vehicle by the operator.

As an optional step 212, the vehicle may transition into a Lane Keeping Assist (LKA) mode of operation. As the vehicle exits the parking space and enters a lane of traffic, activation of this mode of operation can occur, in which the lane detection camera/sensors 16 can be activated and signals sent to the processor 12. The processor 12 can then send alerts or control the vehicle as previously discussed to keep the vehicle in the lane of traffic.

Figure 6:
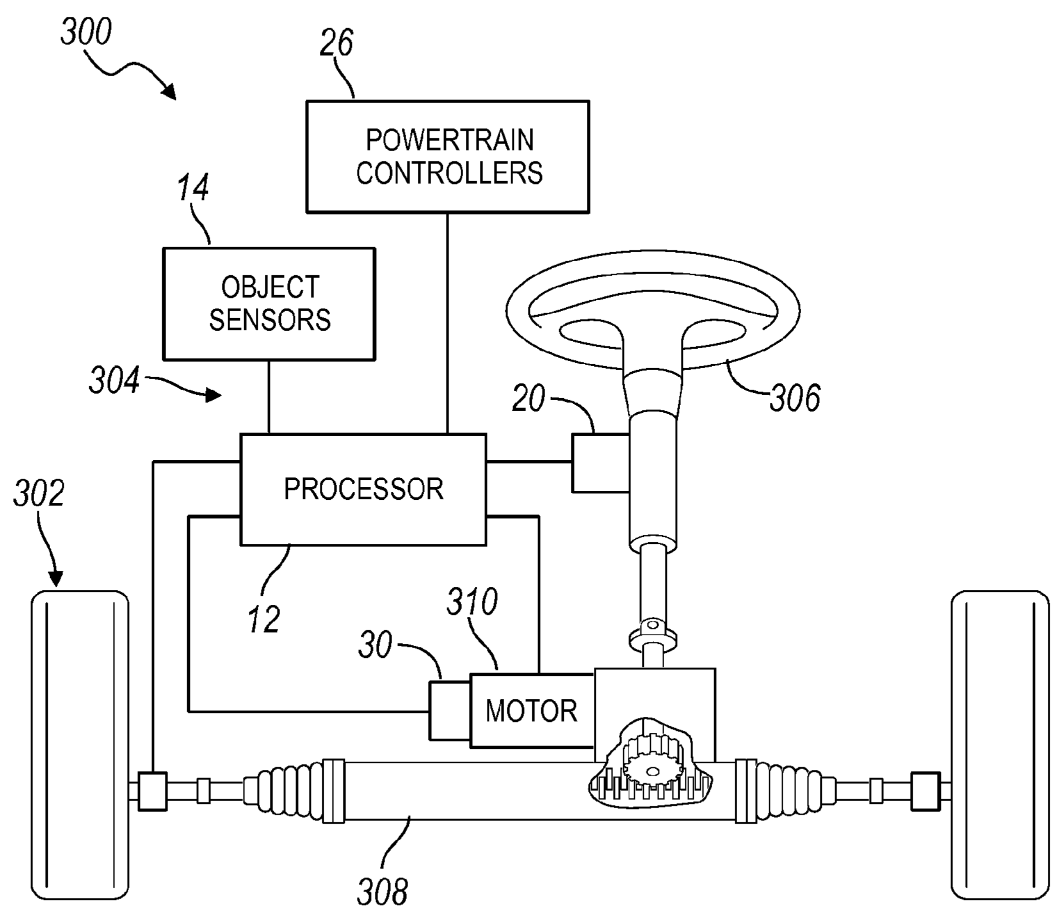
FIG. 6 is a schematic of an automatically controlled power steering system according to one embodiment.

Referring to FIG. 6, a diagram of an automatic steering system is illustrated. The processor 12 receives signals from the object sensors 14, for example, and issues commands to the automatic steering system as well as the powertrain controllers 26 to automatically exit the vehicle from the parking space. The processor 12 is in a vehicle 300 that includes a pair of turnable wheels 302. The wheels 302 may be the front wheels on the vehicle 300. The vehicle 300 also includes a steering system 304. The steering system 304 has a steering wheel 306 in rotatable connection with the wheels 302, through a steering linkage 308. The steering linkage 308 transfers the rotational input of the steering wheel 306 to the wheels 302, and vice versa. The steering linkage 308 may comprise a steering column extending from the steering wheel 306 into a steering gearbox connecting tie rods to knuckles (not shown) to which hub and bearing assemblies (not shown) may be mounted to connect the wheels 302 to the steering wheel 306.

The steering linkage 308, specifically the steering gearbox, may provide a mechanical advantage from the steering wheel 306 to the road wheel 302. The mechanical advantage of the steering linkage 308 is such that the steering wheel 306 may go through multiple revolutions in a single direction while the wheel 302 pivots less than 180 degrees in a single direction from a maximum left turn pivot to a maximum right turn pivot, or vice versa. The steering linkage 308 is diagrammatically shown here as a rack and pinion steering gearbox, although any other may be used. The steering linkage 308 may also provide for a variable ratio steering such that the rate of pivot of the wheel 302 is increased or decreased near a straight-forward position (such as on large heavy duty vehicles) or at the ends of the left hand or right hand turning spectrums (such as on smaller automobiles and passenger cars).

A power-steering motor 310 may be coupled with the steering linkage 308 and used to assist in the turning of the wheels 302. The power-steering motor 310 is configured to provide torque into the steering system to turn the wheels 302 on the vehicle 300. Power-steering motor 310 may be an electronic power assist motor used to provide power assistance to aid in the turning of the wheels 302 when a driver turns the steering wheel 306, or may be a motor fully capable of executing the autopark event, in which the motor 310 turns the wheels 302 while the vehicle performs an automatic computer controlled park-out even, as described above. In other words, during the autopark event described above, when exiting the parking space, signals are sent to the steering wheel controller 30 which, in turn, controls operation of the motor 310 to turn the wheels.

The steering wheel torque sensor 20 described above is also illustrated. As described, the toque sensor is communicatively coupled to the steering wheel 306 to measure an amount of torque or force applied to the steering wheel 306 by the operator. During the park-out event, the POA session may cease, controlled limitations on the maximum permissible speed/acceleration may be removed, and automatic steering may cease based on a force being applied to the steering wheel 306 as sensed by the steering wheel torque sensor 20. These actions may only occur if a force or torque above a certain threshold is provided to the steering wheel 306.

It is of course contemplated that the overall operation of the automatic steering system 204 may be controlled by one or more processor 12 based on the input signals received from various sensors or cameras 14-24. Thus, the vehicle can automatically exit the parking space with limited user input.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A computerized method of exiting a vehicle from a parking space, comprising:

instructing a driver to release a steering wheel;

subsequent to the steering wheel being released, limiting a maximum-permissible-speed of the vehicle based on a distance between the vehicle and an external object;

automatically turning the steering wheel;

automatically accelerating away from the parking space; and while moving away from the parking space, gradually increasing the maximum-permissible-speed based on the distance increasing.

2. The method of claim 1, wherein a demanded acceleration of the vehicle is defined by accelerator pedal position, further comprising gradually increasing an actual acceleration of the vehicle towards the demanded acceleration of the vehicle based on the distance increasing.

3. The method of claim 1, wherein the limiting includes limiting the maximum-permissible-speed irrespective of accelerator pedal position.

4. The method of claim 1, further comprising, prior to the step of automatically accelerating, instructing the driver to depress an accelerator pedal.

5. The method of claim 1, further comprising activating a park-out-assist (POA) operational mode based on a user selection, wherein the steps of instructing, limiting, automatically turning, automatically accelerating, and gradually increasing are accomplished based on the POA operational mode being activated.

6. The method of claim 1, further comprising removing limits on the maximum-permissible-speed based on a force being applied to the steering wheel.

7. The method of claim 1, wherein the step of gradually increasing the maximum-permissible-speed is further based on a time elapsing subsequent to the distance exceeding a threshold.

8. A vehicle comprising:

a plurality of object-detecting sensors configured to detect a location of external objects; and at least one controller programmed to, in response to an operator activating an operational mode configured to automatically assist the vehicle in exiting a parallel parking spot, modify a limit on an actual speed of the vehicle based on an increasing distance between the vehicle and the external objects as the vehicle exits the parallel parking spot.

9. The vehicle of claim 8, wherein the at least one controller is further programmed to limit the speed at a linear rate based on the distance.

10. The vehicle of claim 8, further comprising an accelerator pedal that, when depressed, indicates an amount of demanded acceleration, wherein the at least one controller is further programmed to limit actual acceleration of the vehicle to an amount less than the demanded acceleration based on the distance between the vehicle and the external objects.

11. The vehicle of claim 10, wherein the at least one controller is further programmed to reduce the limit and increase the actual acceleration towards the demanded acceleration in response to the distance increasing.

12. The vehicle of claim 8, wherein the at least one controller is further programmed to turn wheels of the vehicle to a position based on the location of the external objects.

13. The vehicle of claim 12, wherein an intended direction of travel is defined by the position of the wheels, and wherein the at least one controller is further programmed to limit the actual speed of the vehicle based on the external objects being located along the intended direction of travel.

14. The vehicle of claim 8, further comprising a steering wheel sensor coupled to the at least one controller and configured to detect a force being applied to a steering wheel by the operator, wherein the at least one controller is further programmed to remove the limit on the actual speed of the vehicle based on a force being applied to the steering wheel.

15. A vehicle comprising:

a plurality of sensors configured to sense a location of a first object in front of the vehicle and a second object behind the vehicle while the vehicle is parked in a parallel parking spot between the first and second objects; and at least one controller coupled to the sensors and programmed to reduce a constraint on permissible acceleration of the vehicle as the vehicle exits the parallel parking spot.

16. The vehicle of claim 15, wherein the at least one controller is further programmed to enable an actual acceleration of the vehicle to increase towards a demanded acceleration of the vehicle based on a distance between the vehicle and at least one of the first and second objects.

17. The vehicle of claim 15, wherein the at least one controller is further programmed to enable an actual acceleration of the vehicle to increase towards a demanded acceleration of the vehicle based on a time since the vehicle exited the parallel parking spot.

18. The vehicle of claim 15, further comprising a steering wheel sensor coupled to the at least one controller, wherein the at least one controller is further programmed to remove the constraint on permissible acceleration of the vehicle based on a force being applied to the steering wheel.

19. The vehicle of claim 15, wherein the at least one controller is further programmed to turn wheels of the vehicle to a position based on a location of the first object.

20. The vehicle of claim 19, wherein an intended direction of travel is defined by the position of the wheels, and wherein the at least one controller is further programmed to reduce the constraint on the permissible acceleration of the vehicle based on the first object being located along the intended direction of travel.

* * * * *